United States Patent [19]
Yong-Set

[11] Patent Number: 5,365,688
[45] Date of Patent: Nov. 22, 1994

[54] FISH GAFF APPARATUS

[76] Inventor: Bernard Yong-Set, 273 Port Union Rd., Scarborough, Ontario, Canada, M1C 2L3

[21] Appl. No.: 86,107
[22] Filed: Jul. 6, 1993
[51] Int. Cl.5 .............................................. A01K 97/14
[52] U.S. Cl. ......................................... 43/5; 294/19.1
[58] Field of Search ............................ 43/5, 4, 4.5, 6; 294/19.1

[56] References Cited

U.S. PATENT DOCUMENTS

| | | | |
|---|---|---|---|
| 2,677,911 | 5/1954 | Fink | 43/5 |
| 2,924,482 | 2/1960 | Gibson | 43/6 |
| 2,979,013 | 4/1961 | Whittall | 294/19.1 |
| 3,273,928 | 9/1966 | Wisniewski | 294/19.1 |
| 3,844,602 | 10/1974 | Johansson | 43/5 |
| 4,595,223 | 6/1986 | Hawie | 294/19.1 |
| 4,751,892 | 6/1988 | Sechel et al. | 294/19.1 |
| 4,881,338 | 11/1989 | Lung | 43/5 |
| 4,932,700 | 6/1990 | Hart | 294/19.1 |

Primary Examiner—P. Austin Bradley
Assistant Examiner—Chuck Y. Mah
Attorney, Agent, or Firm—R. Craig Armstrong

[57] ABSTRACT

A fish gaff apparatus has a hook member and a pole member. The hook member has a nook portion and a cover portion that is biased to assume different positions relative to the hook portion. The cover portion in a first position extends between both ends of the hook portion to prevent injury by the hook end of the latter. The cover portion in a second position holds the hook member on the pole member. Using the pole member, the hook member is inserted into a fish. The pole member is then moved relative to the hook member to disconnect those two members, and the bias between the two portions of the hook member moves the cover portion back toward its first position to press against the fish. The hook member may be constructed from a single length of wire.

6 Claims, 2 Drawing Sheets

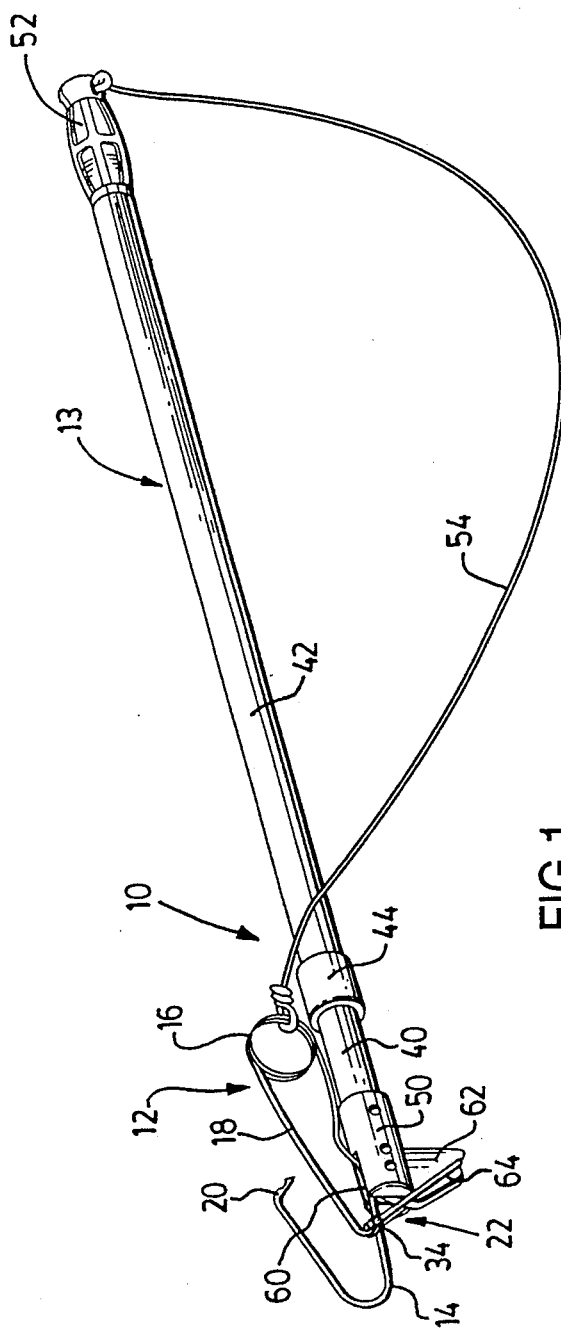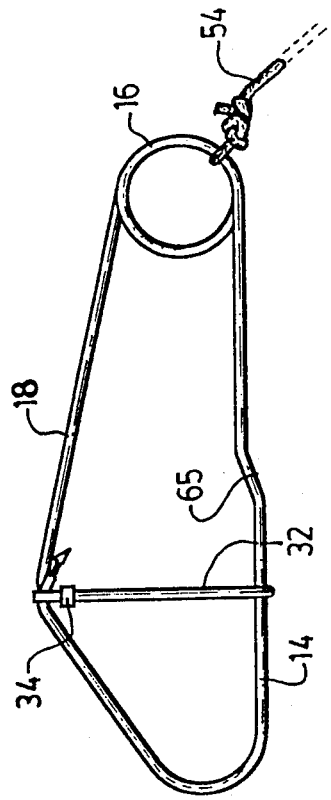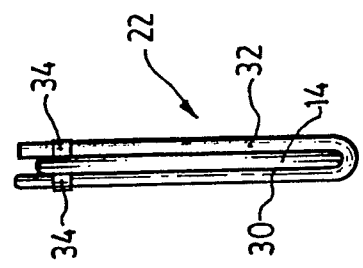

FISH GAFF APPARATUS

This invention relates to fishing gear, and in particular, to a fish gaff apparatus formed by a pole and a hook adapted to be separated from the pole after insertion into a fish.

Prior art gaffs suitable for hauling a large game fish into a boat commonly consist of a sharp hook attached to a metal bar or tube. As the fish moves adjacent the boat, the fisherman impales the fish with the gaff and uses it to haul the fish into the boat. It may require a number of attempts and great effort to land the fish, and the fish may suffer serious damage. The gaffs themselves must be built strongly, and this limits material selection. Use of steel or other heavy material is often required, causing weight and storage problems. For salt water applications, use of suitable corrosion-resistant materials with sufficient strength, such as stainless steel, results in greater cost. Sharp protruding hooks on gaffs introduce safety hazards, and manually-applied caps or covers are needed to shield the hook during non-use. Such safety devices provide no protection when the gaff is in use, and can easily be lost or misplaced.

Another configuration of the prior art consists of a similar construction to that mentioned previously, but contains a triggering mechanism which allows the gaff to lock. This type of device can be quite dangerous if accidentally triggered. U.S. Pat. No. 5,038,514 discloses a fish stringer that is quite effective for securing smaller fish. However, that device is not very useful for landing larger game fish. That prior art makes use of a gaffing mechanism opened and closed manually within hands' reach of the fish.

The majority of the prior art results in significant physical damage to the fish. The impaling hooks are inaccurate, and are sometimes used several times before a fish can be landed. If "catch and release" fishing is being practised, safe release is inhibited by sustained injury during landing.

It is an object of the invention to provide a simple, safe and reliable gaff apparatus for a fish. Such an apparatus has particular application for sports fishing. The invention enables one to impale a fish through the lip from a considerable distance so as to secure it, usually without inflicting significant injury to the fish. The fish, now secured, can remain in the water allowing it to adjust to any environmental changes before being released or lifted into the boat or the like by means of an attached line.

The invention is a fish gaff apparatus comprising a hook member and a pole member for supporting the hook member in use. The gaff hook member has a hook portion and a cover portion biased relative to the hook portion such that in a first position of the cover portion one part of that cover portion extends between the two ends of the hook portion. The pole member has a support member on its one end. The hook member is adapted to be supported on the support member by the bias between the hook portion and the cover portion in a second position of the cover portion. The hook end of the hook portion is exposed for use when the cover portion is in such second position. Removal of the pole member from the hook member after insertion of the hook member in a fish results in the cover portion of the hook member moving from the second position to the first position to press against the fish.

The hook portion and the cover portion may be formed from an integral single length of wire, with the bias between the hook portion and the cover portion being created by a looped section of such wire between those portions. The cover portion may be defined by a first section of the wire extending from the looped section and by a second section of the wire connected at its one end to the first section and generally forming a right angle with the first section. In the second position of the cover portion a section of the wire defining the hook portion may rest on one side of the support member, and the other end of the second section of wire may rest on an opposite side of the support member. The second section of wire may be defined by a double length of the wire defining a slot within which the hook portion is adapted to slide. The one side of the support member may have a channel in which the hook portion extends, and the opposite side of the support member may have a notch for receiving the other end of the second section of wire. The pole member may be telescopic. The hook member may have a cord attached, and that cord may also De attached to the other end of the pole member.

The invention will now be more fully described by means of a preferred embodiment, utilizing the accompanying drawings, in which:

FIG. 1 is a perspective view of the fish gaff apparatus of the invention, the view illustrating the hook member and pole member connected by a cord;

FIG. 2 is a side view of the hook member, a cover portion of that member extending between the two ends of the hook portion;

FIG. 3 is a view of the left end of the hook member of FIG. 2.

Figure 4:
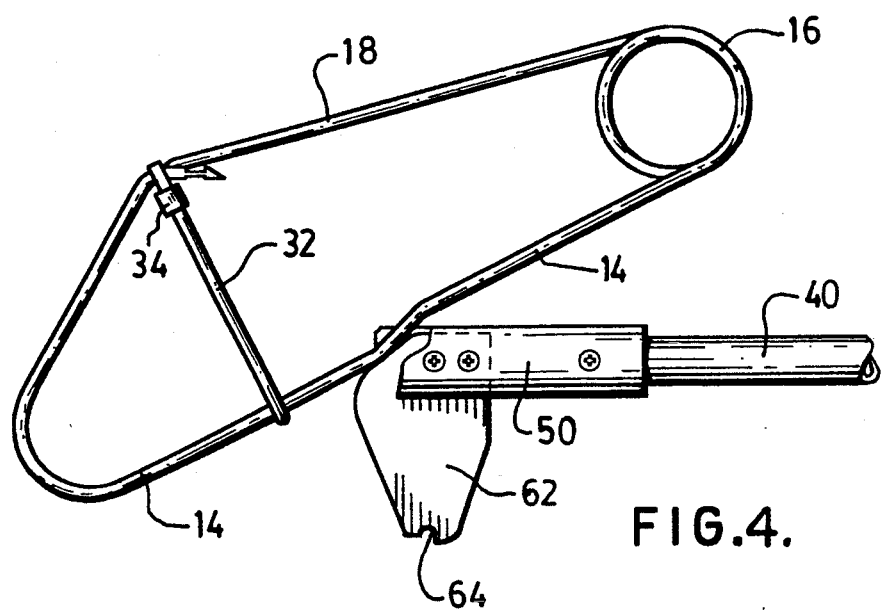
FIG. 4 is a side view illustrating the placement of the hook member on the pole member, the hook portion of the hook member entering a channel on one side of a support member on the pole.

Referring to FIG. 1, a gaff apparatus generally designated 10 has a hook member generally designated 12 that is created from a single piece of stainless spring steel rod, 0.187 inches in diameter, and an aluminum pole member generally designated 13. Hook member 12 is formed into a generally triangular shape with a length of about 11 inches and a height of about 4 inches. The triangular shape is defined by a hook portion 14 connected to an integral loop portion 16, which in turn is connected to a cover portion defined by a first section 18 extending to the hook end 20 of hook portion 14, and by a second section 22 connected to first section 18. Second section 22 is created from a double length of wire. As shown in FIG. 3, the wire at one end of first section 18 bends in a near right angle into a first leg 30 of second section 22. The wire at the other end of first leg 30 bends in a semicircular arc into a second leg 32 parallel to leg 30, and a band 34 connects the two legs.

Pole member 13 is telescopic, having a tube 40 mounted within a larger tube 42. A lockable sleeve 44 holds tubes 40 and 42 in any selected relative position. One end of pole member 13 has a molded support member 50 fastened to it, and the other end of pole member 13 has a handgrip 52 on it. A cord 54 extends between the loop portion 16 of hook member 12 and handgrip 52 on pole member 13.

Figure 5:
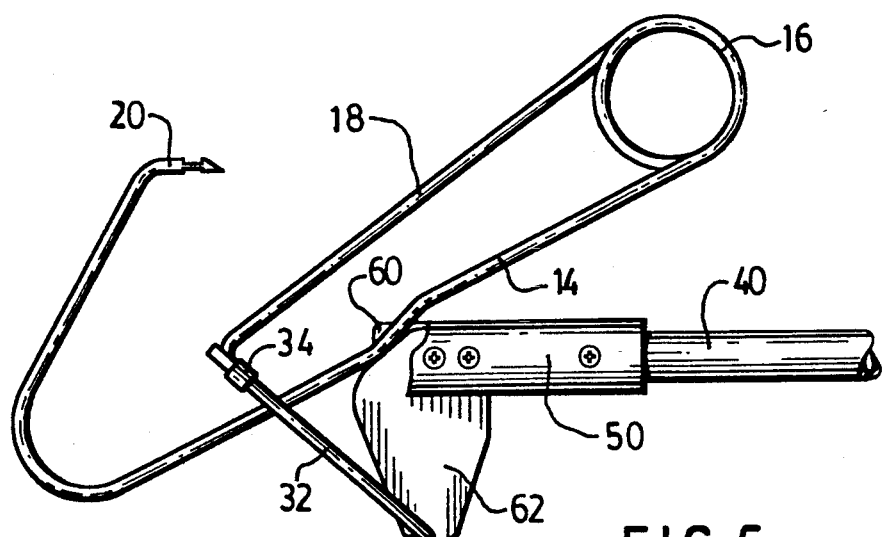
FIG. 5 is a side view similar to FIG. 4, but additionally illustrating part of the cover portion flexed to fit into a groove on the other side of the support member.
Figure 6:
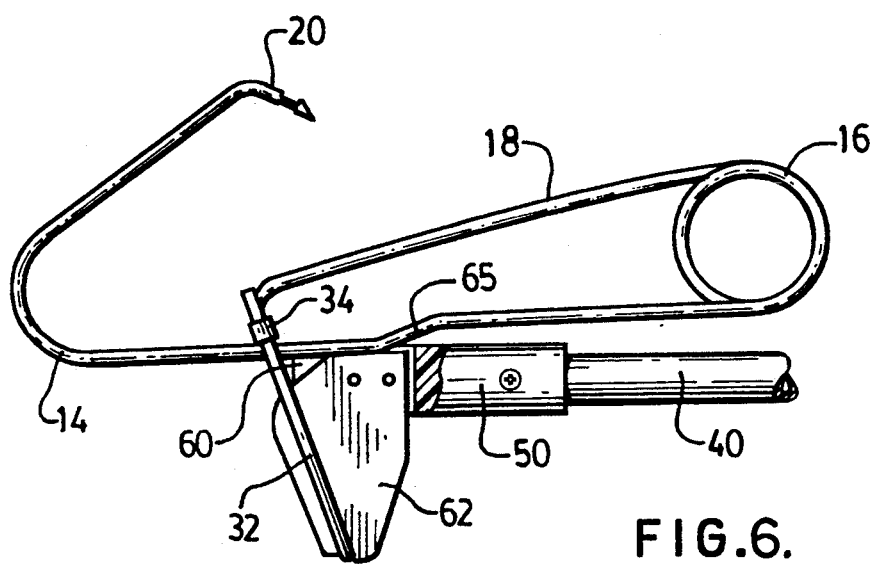
FIG. 6 is a side view similar to FIG. 5, but additionally illustrating the hook member rotated relative to the pole member such that the hook portion rests in the channel on the support member.

Support member 50 has a channel 60 in its upper face, and has a finned extension 62 in which there is a notch 64. Hook member 12 is supported on support member 50 as shown in FIGS. 4, 5 and 6. Hook member 12 is brought adjacent to pole member 13 such that hook portion 14 extends into an angled outer portion of channel 60, as shown in FIG. 4. The user then squeezes together hook portion 14 and the first section 18 of the cover portion of hook member 12, as shown in FIG. 5. Hook portion 14 moves upward in the slot between first leg 30 and second leg 32, and the user moves the semicircular arc between legs 30 and 32 into notch 64. Then hook member 12 is tilted on support member 60 such that hook portion 14 extends generally parallel to the axis of pole member 13. This represents a stable relative positioning between hook member 12 and pole member 13, and one that the two will maintain until such time as pole member 13 is pulled away from hook member 12 after a fish has been engaged by the latter. Hook portion 14 has an offset bend 65 that increases the tension in this locked position, and also defines the longitudinal position of hook member 12 on pole member 13.

With hook member 12 supported on pole member 13, as shown in FIG. 6, the whole gaff apparatus is moved by means of handgrip 52 such that hook end 20 pierces a lip of a fish. Then pole member 13 is bent such that hook portion 14 rotates onto the angled outer portion of support member 60, and hook member 12 is then released from pole member 13. The user can then turn around pole member 13, and use its connection to hook member 12 through cord 54 to haul the fish from the water.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, it is anticipated that the invention may be made in a range of sizes, and in a variety of shapes and materials. The shape obviously does not need to be exactly as described above and illustrated in the drawings.

What is claimed as the invention is:

1. A fish gaff apparatus comprising a hook member and a pole member for supporting the hook member in use, the hook member having a hook portion and having a cover portion biased relative to the hook portion such that in a first configuration of the hook member one part of the cover portion covers a hook end of the hook portion, the pole member including a support member on its one end, the hook member being adapted to be supported on the support member by the bias between the hook portion and the cover portion in a second configuration of the hook member, the hook end of the hook portion being exposed for use when the hook member is in such second configuration, movement of the pole member relative to the hook member after insertion of the hook member in a fish resulting in separation of the hook member from the pole member and in the hook member changing from the second configuration to the first configuration, the fish being held between the hook portion and the cover portion of the hook member in the first configuration, wherein the hook portion and the cover portion are formed from an integral single length of wire, and wherein the bias between the hook portion and the cover portion is created by a looped section of such wire between those portions.

2. A fish gaff apparatus as in claim 1, wherein the cover portion is defined by a first section of the wire extending from the looped section and by a second section of the wire connected at its one end to the first section and generally forming a right angle with the first section.

3. A fish gaff apparatus as in claim 2, wherein in the second configuration of the hook member a section of the wire defining the hook portion rests on one side of the support member, and the other end of the second section of wire rests on an opposite side of the support member.

4. A fish gaff apparatus as in claim 3, wherein the second section of wire is defined by a double length of the wire defining a slot within which the hook portion is adapted to slide.

5. A fish gaff apparatus as in claim 4, wherein the one side of the support member has a channel in which the hook portion extends, and wherein the opposite side of the support member has a notch for receiving the other end of the second section of wire.

6. A fish gaff apparatus as in claim 3, wherein the one side of the support member has a channel in which the hook portion extends, and wherein the opposite side of the support member has a notch for receiving the other end of the second section of wire.

* * * * *